United States Patent
Turner

(10) Patent No.: US 6,615,960 B1
(45) Date of Patent: Sep. 9, 2003

(54) FLUID DAMPED SHOCK ABSORBER AND METHOD

(75) Inventor: Paul H. Turner, Boulder, CO (US)

(73) Assignee: Maverick American LLC, Boulder, CO (US)

( * ) Notice: Subject to any disclaimer, the term of this patent is extended or adjusted under 35 U.S.C. 154(b) by 0 days.

(21) Appl. No.: 09/502,272

(22) Filed: Feb. 11, 2000

(51) Int. Cl.[7] .................. F16F 9/34; F16F 9/00; F16F 9/48
(52) U.S. Cl. .................. 188/322.13; 188/322.19; 188/286; 280/276
(58) Field of Search ................. 188/275, 280, 188/281, 282.1, 314, 315, 287, 284, 319.2, 322.13, 322.2, 286; 280/276

(56) References Cited

U.S. PATENT DOCUMENTS

| | | | |
|---|---|---|---|
| 2,329,803 A | * 9/1943 | Whisler, Jr. ............... 188/88 |
| 2,934,332 A | 4/1960 | Mercier .................... 267/8 |
| 3,687,438 A | 8/1972 | Rickard ................... 267/64 |
| 4,153,237 A | * 5/1979 | Supalla ................ 267/64.15 |
| 4,807,860 A | * 2/1989 | Simons ................... 267/217 |
| 4,971,344 A | 11/1990 | Turner .................... 280/276 |
| 5,186,481 A | 2/1993 | Turner .................... 280/276 |
| 5,285,875 A | * 2/1994 | Munoz .................... 188/275 |
| 5,332,068 A | * 7/1994 | Richardson et al. ....... 188/275 |
| 5,386,893 A | * 2/1995 | Feigel .................... 188/299 |
| 5,400,877 A | * 3/1995 | Kircher et al. ........... 188/299 |
| 5,456,480 A | 10/1995 | Turner et al. ............ 280/276 |
| 5,462,140 A | * 10/1995 | Cazort et al. ............ 188/275 |
| 5,464,079 A | * 11/1995 | Lohberg et al. .......... 188/315 |
| 5,467,852 A | * 11/1995 | de Kock ............... 188/322.14 |
| 5,529,154 A | * 6/1996 | Tanaka ................ 188/322.15 |
| 5,580,075 A | 12/1996 | Turner et al. ............ 280/276 |
| 5,634,653 A | 6/1997 | Browning ................ 280/276 |
| D391,530 S | 3/1998 | Turner .................... D12/118 |
| 5,725,226 A | * 3/1998 | Cabrerizo-Pariente ..... 280/276 |
| 5,775,677 A | 7/1998 | Englund ................. 267/64.11 |
| D401,537 S | 11/1998 | Turner .................... D12/118 |
| 5,862,895 A | 1/1999 | Ricard ................... 188/289 |
| D406,083 S | 2/1999 | Turner .................... D12/118 |
| 5,996,746 A | 12/1999 | Turner et al. ............ 188/269 |

FOREIGN PATENT DOCUMENTS

| | | | | |
|---|---|---|---|---|
| JP | 4337137 | * | 11/1992 | |
| JP | 4337138 | * | 11/1992 | |
| WO | 9608950 | * | 3/1996 | .......... 188/266.5 |

* cited by examiner

Primary Examiner—Matthew C. Graham
Assistant Examiner—Melody M. Burch
(74) Attorney, Agent, or Firm—Townsend and Townsend and Crew LLP

(57) ABSTRACT

A fluid damped shock absorber comprises an outer tube having a closed end and an open end, and a damper tube disposed within the outer tube. An inner tube is axially slideable within the outer tube and has a closed end and an open end. A sealing piston is attached to the inner tube to provide a seal between the inside of the outer tube and the outside of the damper tube. A sealing device is attached near the open end of the outer tube to provide a seal between the outside of the inner tube and the outer tube. A regulation valve is fixed to the damper tube in a sealed arrangement with the outer tube. The regulation valve is located between the closed end of the outer tube and the sealing piston. The regulation valve is configured to regulate fluid flow of a damping fluid between the outer tube and the damper tube upon axial movement of the inner tube within the outer tube.

32 Claims, 10 Drawing Sheets

FLUID DAMPED SHOCK ABSORBER AND METHOD

BACKGROUND OF THE INVENTION

This invention relates generally to the field of shock absorbers. In particular, the invention relates to fluid-damped shock absorbers.

Shock absorbers are used in a wide variety of applications. For example, shock absorbers are commonly used in vehicles, such as automobiles, trucks, motorcycles, and bicycles. Shock absorbers are also used with various industrial and engineering applications, such as with machinery, tools, trailers, lifting systems, handling systems, and the like.

One particular use of shock absorbers is with vehicle suspension systems. Such suspension systems are often designed to counter the effects of a wide variety of operating conditions. For example, such suspension systems are often designed to counter the effects created when accelerating, braking, and encountering bumps. Vehicle weight, rigidity, and the like are also factors that may be considered when designing a suspension system.

One recent trend is to use shock absorbers with bicycle suspension systems to provide a more comfortable ride and to improve the operating characteristics of the bicycle. Merely by way of example, one such suspension system is described in co-pending U.S. application Ser. No. 09/502,746, filed on the same date as the present application, the complete disclosure of which is herein incorporated herein by reference. In many bicycle suspension systems, it is important to control both compression and rebound of the shock to optimize the performance of the suspension system. Further, the vehicle may be subjected to different types of compressive forces. As such, the shock absorber may need to be designed to compensate for these various types of forces. For example, the vehicle may experience a quick jolt when encountering a bump to produce an abrupt compressive force on the shock absorber. The suspension may also experience a slower type of Compression force, such as when accelerating or climbing a steep hill.

Hence, the invention relates to shock absorbers that are useful with a variety of operating conditions. The shock absorbers of the invention may also find use with suspension systems that experience a variety of forces, including various types of compression and expansion forces.

SUMMARY OF THE INVENTION

The invention provides a fluid-damped shock absorber that comprises an outer tube having a closed end and an open end. A damper tube is disposed within the outer tube, and an inner tube is axially slidable within the outer tube. The inner tube has a closed end and an open end. A sealing piston is attached to the inner tube to provide a seal between the inside of the outer tube and the outside of the damper tube. A sealing device is attached near the open end of the outer tube to provide a seal between the outside of the inner tube and the outer tube. In this way, the inner tube may be axially translated within the outer tube as the shock absorber experiences compressive and expansive forces. As the inner tube slides within the outer tube, the inner tube slides over the damper tube.

In one embodiment, the shock absorber further includes a regulation valve that is fixed to the damper tube in a sealed arrangement with the outer tube. The regulation valve is located between the closed end of the outer tube and the sealing piston. The regulation valve is configured to regulate fluid flow of a damping fluid between the outer tube and the damper tube upon axial movement of the inner tube within the outer tube. Hence, when the shock absorber is compressed, the regulation valve regulates the flow of the damper fluid from the outer tube and into the damper tube where it flows into the inner tube. Conversely, when the shock absorber is extended, the regulation valve regulates the flow of the damper fluid from the damper tube and back into the outer tube.

Conveniently, the regulation valve may comprise an annular member having a top side, a bottom side, and at least two through holes. The regulation valve may further include a pair of washers that are coupled to the top side and the bottom side such that the damper fluid may pass through one of the through holes in one direction and through the other through hole in the other direction. In so doing, the washers regulate the amount of fluid flow through the through holes.

In one aspect, the shock absorber is configured such that the outer and the damper tube are filled with the damper fluid. Further, a compressible gas is provided within the inner tube. In this way, the pressure of the gas within the inner tube provides a biasing force to resist compression of the shock absorber. Optionally, a floating piston may be disposed within the inner tube to separate the gas from the damper fluid. A biasing member may also be disposed within the inner tube to resist movement of the floating piston toward the closed end of the inner tube. In this way, the biasing member provides an additional biasing force to resist compression of the shock absorber.

In other embodiments, the regulation valve is configured as a one-way valve to regulate the flow of the damping fluid from the damper tube and into the outer tube upon axial movement of the inner tube away from the outer tube. In this way, the regulation valve regulates the flow of the damping fluid through the shock absorber when the shock absorber is extended. Further, the outer tube includes a first orifice that is located between the regulation valve and the sealing piston and a second orifice that is located between the regulation valve and the closed end of the outer tube. A cover is disposed over the first and second orifices and is constructed to permit the flow of the damping fluid between the first and second orifices. Further, a valve shim is disposed over the first orifice. In this way, when the shock absorber is compressed, fluid within the outer tube flows around the regulation valve by passing through the first orifice, deflecting the valve shim, entering into the cover and then passing through the second orifice and back into the outer tube where the damper fluid will flow into the damper tube.

Conveniently, an adjustment mechanism may be provided to adjust the spring tension of the valve shim. In this way, the stiffness of the shock absorber may easily be adjusted. In one aspect, the adjustment mechanism comprises a rigid plate that is slidable over the valve shim to adjust the spring tension of the valve shim. Conveniently, the plate may include a rack gear, and a pinion gear may be coupled to the cover to move the plate and adjust the spring tension of the valve shim.

The shock absorbers of the invention may also include an inertia valve that permits the flow of the damper fluid from the outer tube and into the damper tube when an abrupt compressive force is applied to the shock absorber. With such embodiments, the damper tube may include a stop and an orifice that extends through a wall of the damper tube above the stop. The inertia valve is slidably mounted about the damper tube so as to be movable between a closed position where the inertia valve covers the orifice and an open position where the orifice is uncovered. A biasing mechanism is also provided to bias the inertia valve against the stop to hold the inertia valve in the closed position. When the shock absorber is abruptly compressed, the inertia valve resists any movement because of its relatively large mass. Hence, as the shock absorber compresses, the orifice moves past the inertia valve to the open position where the damper fluid may flow through the orifice and into the damper tube. If the compressive force is not sufficient to overcome the biasing force, the inertia valve remains closed. However, the regulation valve and/or the valve shim may be opened to permit the flow of damper fluid from the outer tube and into the damper tube. In this way, the shock absorber is able to accommodate different types of compressive forces.

In another aspect, a biasing system may be positioned between the sealing piston and the sealing device to bias the sealing piston away from the sealing device and create a negative biasing effect. Conveniently, the biasing system may comprise a gas that is sealed between the sealing piston and the sealing device. In still another aspect, the damper tube may be secured to the closed end of the outer tube. In such cases, the damper tube may include an orifice that extends through a wall of the damper tube at a location between the regulation valve and the closed end of the outer tube.

In another embodiment of the invention, a fluid damped shock absorber is provided. The fluid damped shock absorber has a shock absorber housing that is adapted to hold a fluid, and the housing includes a first orifice and a second orifice that extend through the housing. A cover is disposed over the first and second orifices to permit the flow of the fluid between the first and the second orifices. A valve system regulates the flow of the fluid through the orifices. The valve system comprises a valve member that is disposed over the first orifice and a rigid member that is slidable over the valve member to adjust the spring rate of the valve member.

DESCRIPTION OF THE SPECIFIC EMBODIMENTS

The invention provides various fluid-dampened shock absorbers and methods for their use. The shock absorbers of the invention utilize a damper fluid that moves through the shock absorber during compression or expansion of the shock absorber. The shock absorbers may also use a gas that is compressed or permitted to expand depending on movement of the damper fluid through the shock absorber. The invention may utilize a variety of non-compressible fluids as the damper fluid including mineral oils, petroleum oils, synthetic oils, and the like. A variety of compressible gasses may also be used to provide biasing force including air, nitrogen, and the like. The damper fluids and/or gasses may also be used in combination with other biasing mechanisms, such as springs, to resist compression and/or extension of the shock absorber.

The shock absorbers of the invention are designed to be useful with systems that experience both compression and extension. For example, the shock absorbers may provide particular use with vehicle suspension systems where the wheel relative to the frame may be compressed or extended. Merely by way of example, the shock absorbers may be used as part of a rear suspension system of a bicycle. One exemplary rear suspension system for a bicycle is described in co-pending U.S. application Ser. No. 09/502,746, filed on the same date as the present application, previously incorporated by reference. With such suspension systems, the shock absorber may be subjected to rapidly and/or slowly generated compressive forces. For example, a rapid or abrupt compressive force may be produced when the bicycle encounters a sudden, high frequency bump. Slowly generated compressive forces may result from acceleration, a shift in the rider's mass, shallow, low frequency bumps and the like. The shock absorber may also be subjected to extension forces when braking or shifting of the rider's mass.

Although particularly useful with vehicle suspension systems, it will be appreciated that the shock absorbers are not intended to be limited for use with only such systems. Merely by way of example, the shock absorbers of the invention may be used with a variety of systems where damping is required, including, for example, trailers, lifting systems, handling systems, and the like.

Another particular feature of at least some of the embodiments of the invention is the ability to conveniently adjust the stiffness of the shock absorber. For example, the shock absorbers may be provided with a simple knob that may turned to adjust the damping characteristics of the shock absorber. Some of the embodiments may also be provided with other adjustment mechanisms for fine tuning of the shock absorbers. In this way, the user may conveniently optimize the performance of a damping or suspension system.

Figure 1:
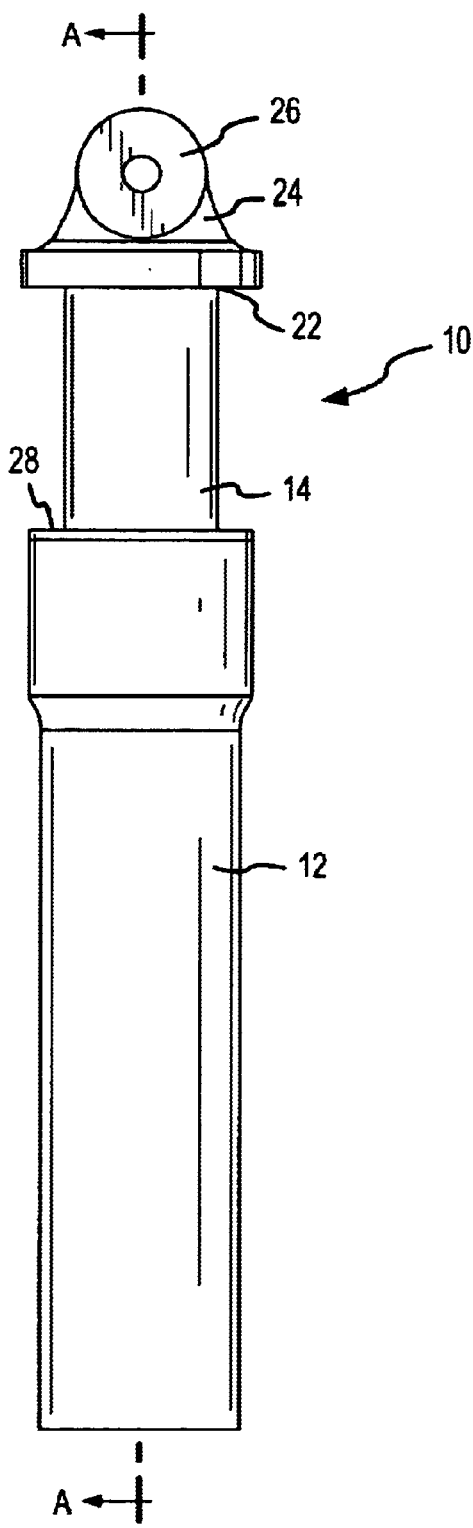
FIG. 1 is a front side view of one embodiment of a shock absorber according to the invention.
Figure 1A:
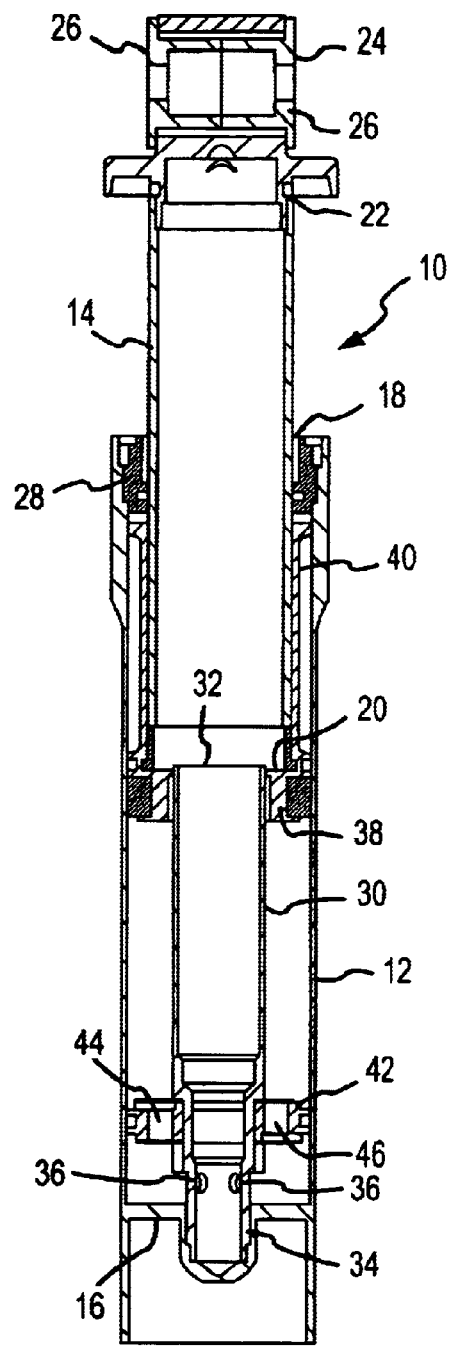
FIG. 1A is a cross-sectional side view of the shock absorber of FIG. 1 taken along lines A—A.
Figure 2:
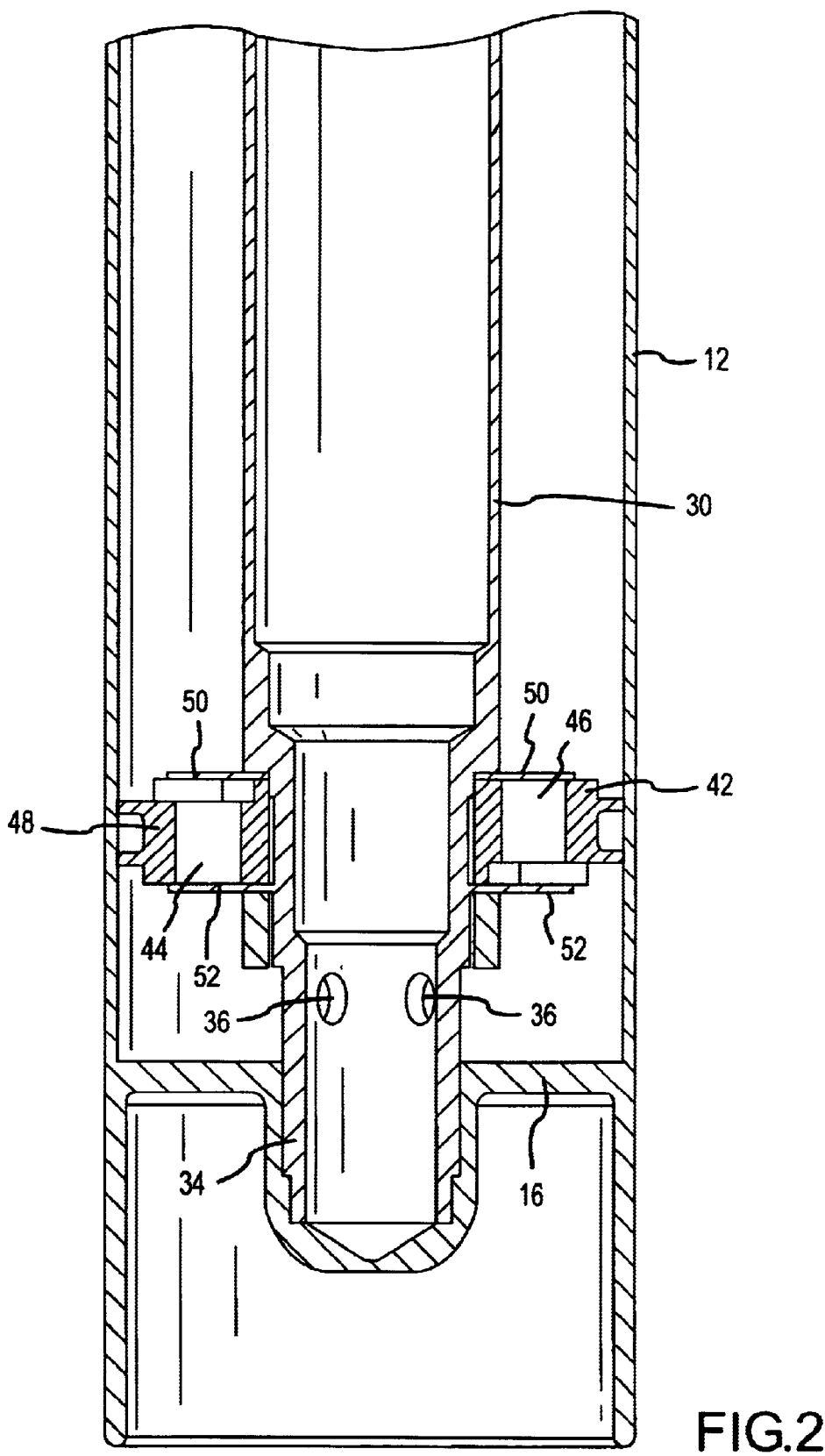
FIG. 2 is an enlarged view of a bottom end of the shock absorber of FIG. 1A.

Referring now to FIGS. 1, 1A, and 2, one embodiment of a shock absorber 10 will be described. Shock absorber 10 comprises an outer tube 12 and an inner tube 14 that is slidable within outer tube 12. Outer tube 12 is constructed of a rigid material such as steel, aluminum, magnesium, or the like, and has a closed bottom end 16 and an open top end 18. Inner tube 14 may also be constructed of a rigid material, including the same materials used to construct outer tube 12. Inner tube 14 includes an open end 20 and a closed end 22. Conveniently, closed end 22 is formed by coupling a top cap 24 to inner tube 14. Optionally, top cap 24 may be provided with a pair of pivot axles 26 to permit shock absorber 10 to be pivotally coupled to a structural member (not shown). However, it will be appreciated that other types of connectors could be coupled to inner tube 14 as well as to outer tube 16.

Coupled to top end 18 of outer tube 12 is a seal head 28 that forms a seal between outer tube 12 and inner tube 14.

In this way, inner tube 14 is permitted to slide within outer tube 12 without leakage of a damper fluid from the interface between outer tube 12 and inner tube 14.

Disposed within outer tube 12 is a damper tube 30. Damper tube 30 has an open top end 32 and a threaded bottom end 34 that is screwed into bottom end 16 of inner tube 14. In this way, damper tube 30 is securely fixed within outer tube 12 and extends vertically through the center of outer tube 12. Damper tube 30 further includes a plurality of orifices 36 that permit fluid flow between outer tube 12 and damper tube 30. However, it will be appreciated that other techniques may be employed to secure damper tube 30 within outer tube 12. For example, damper tube 30 could be spaced apart from bottom end 16, or attached to the inside of the outer tube, so that orifices 36 would not be needed.

As best shown in FIG. 1A, coupled to open end 20 of inner tube 14 is a sealing piston 38 that provides a seal between damper tube 30 and outer tube 12. In this way, when inner tube 14 is moved further into outer tube 12, sealing piston 38 will force a damper fluid that is held between outer tube 12 and damper tube 30 toward bottom end 16. Conveniently, a spacer 40 is provided adjacent to inner tube 14 to prevent extension of inner tube 14 past damper tube 30.

Figure 3:
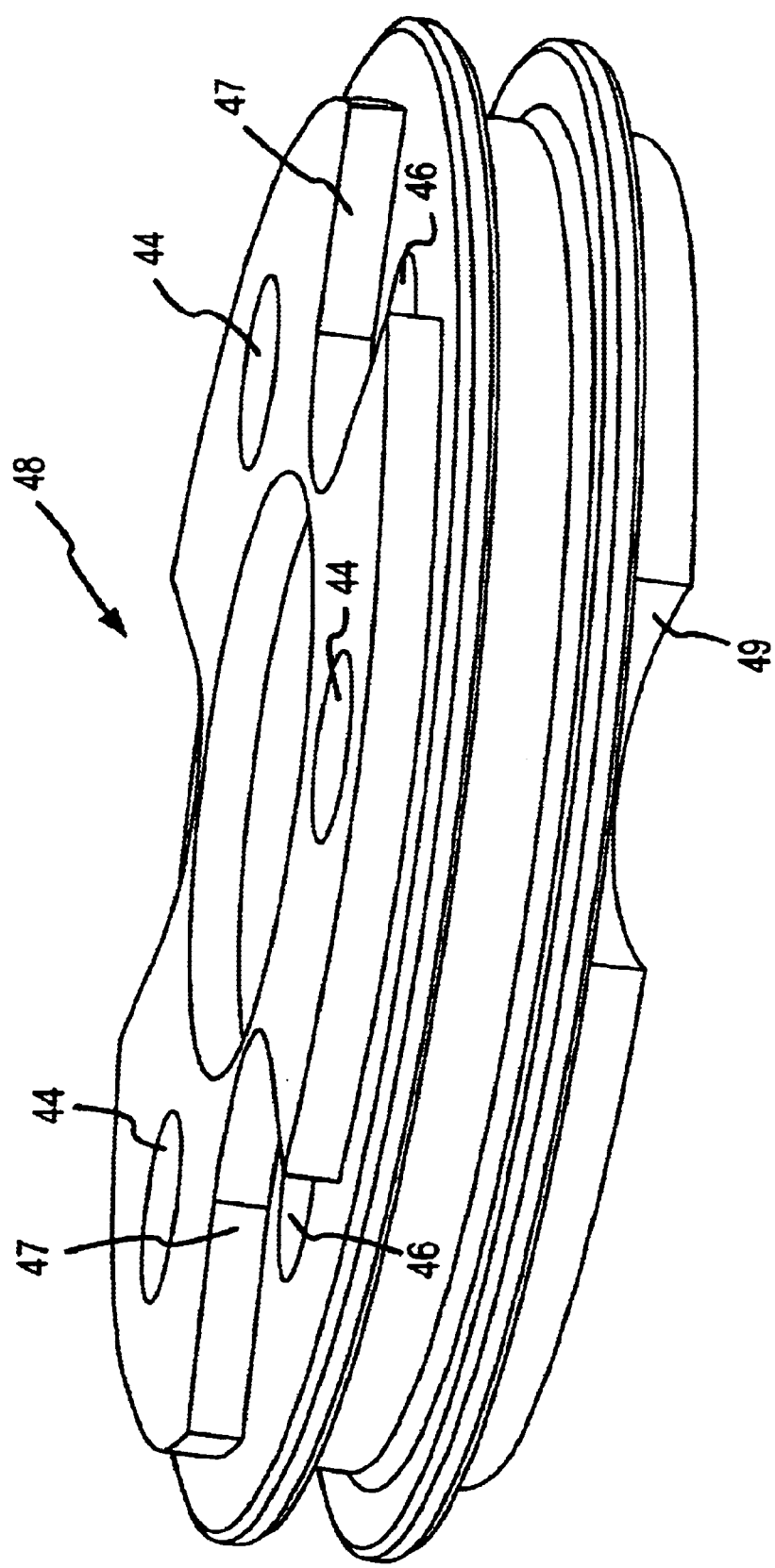
FIG. 3 is a perspective view of an annular member of a regulation valve of the shock absorber of FIG. 2.
Figure 4:
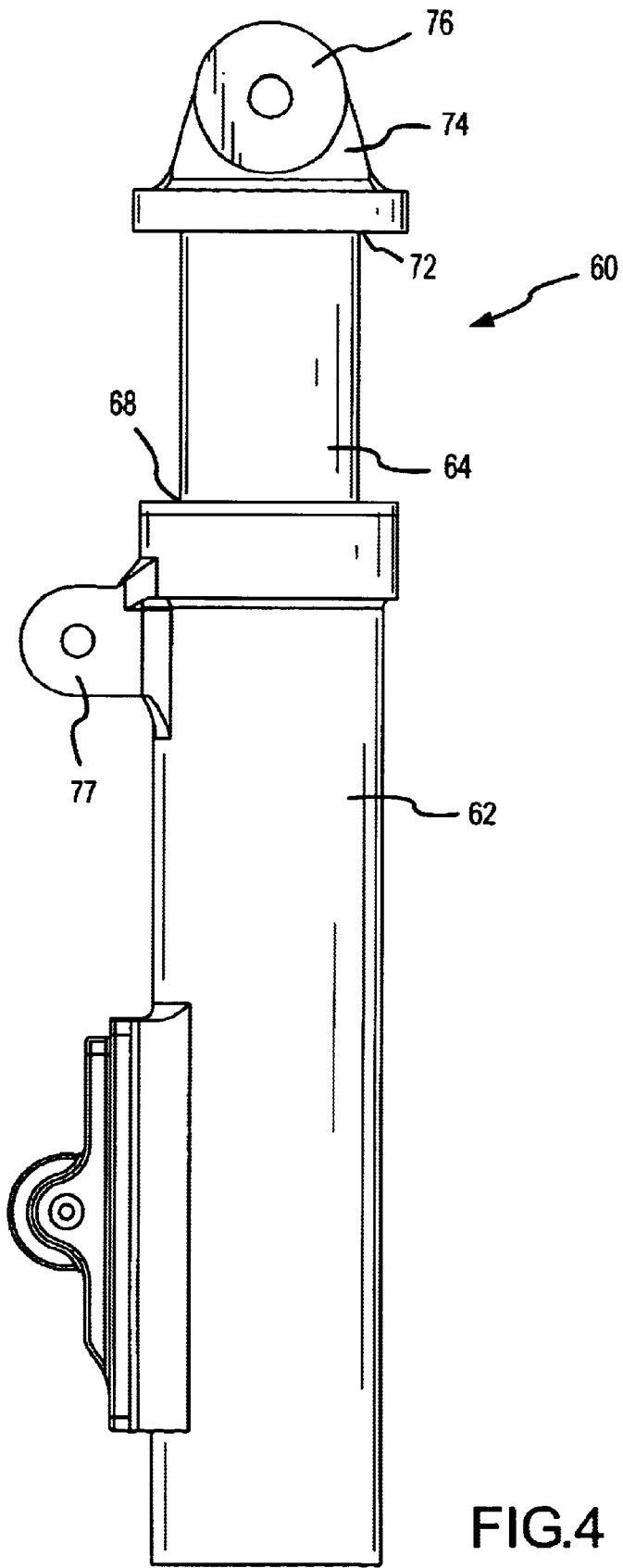
FIG. 4 is a side view of an alternative shock absorber according to the invention.
Figures 5, 5A:
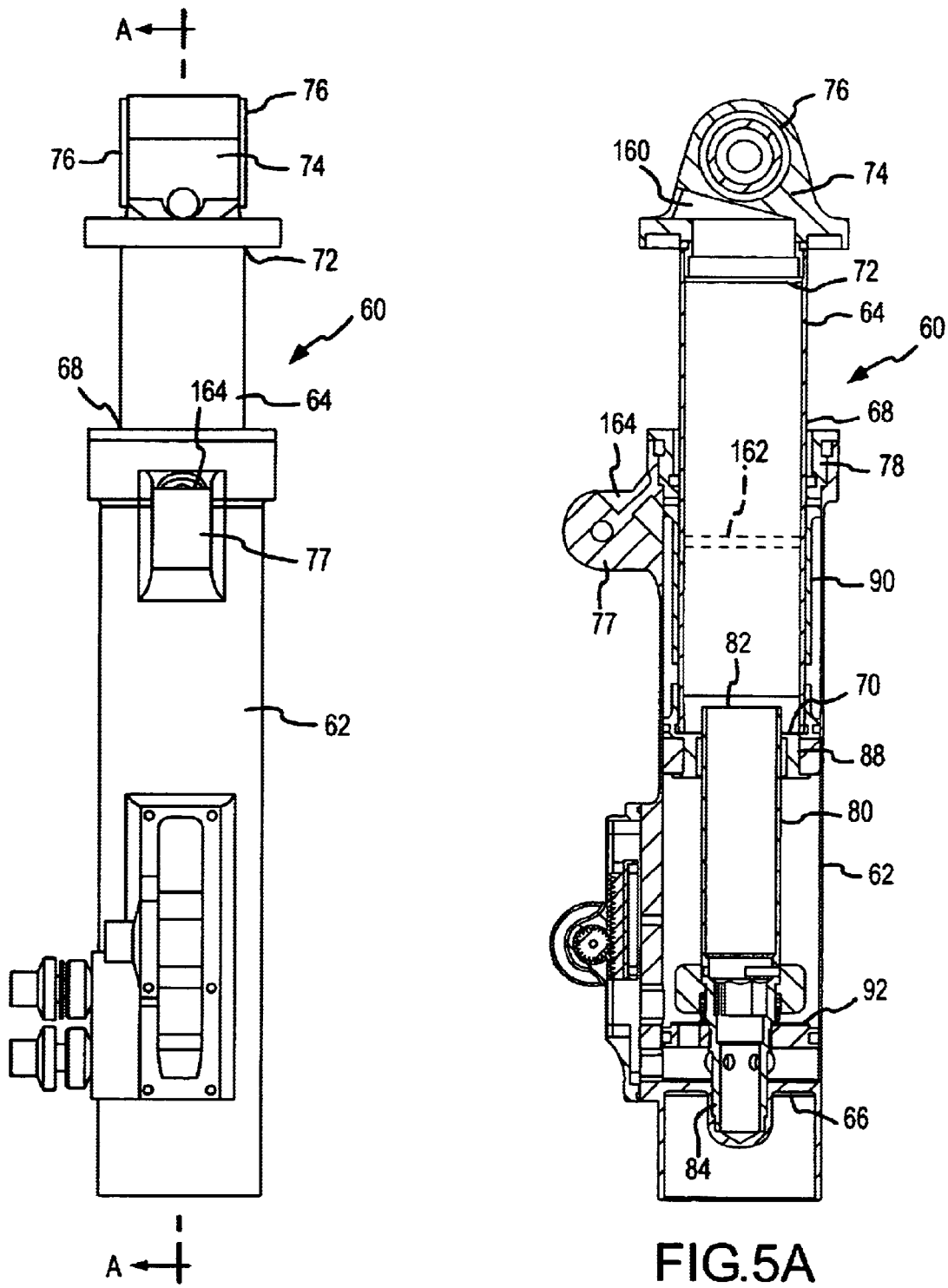
FIG. 5 is a left side view of the shock absorber of FIG. 4.
FIG. 5A is a cross-sectional side view of the shock absorber of FIG. 5 taken along lines A—A.
Figure 6:
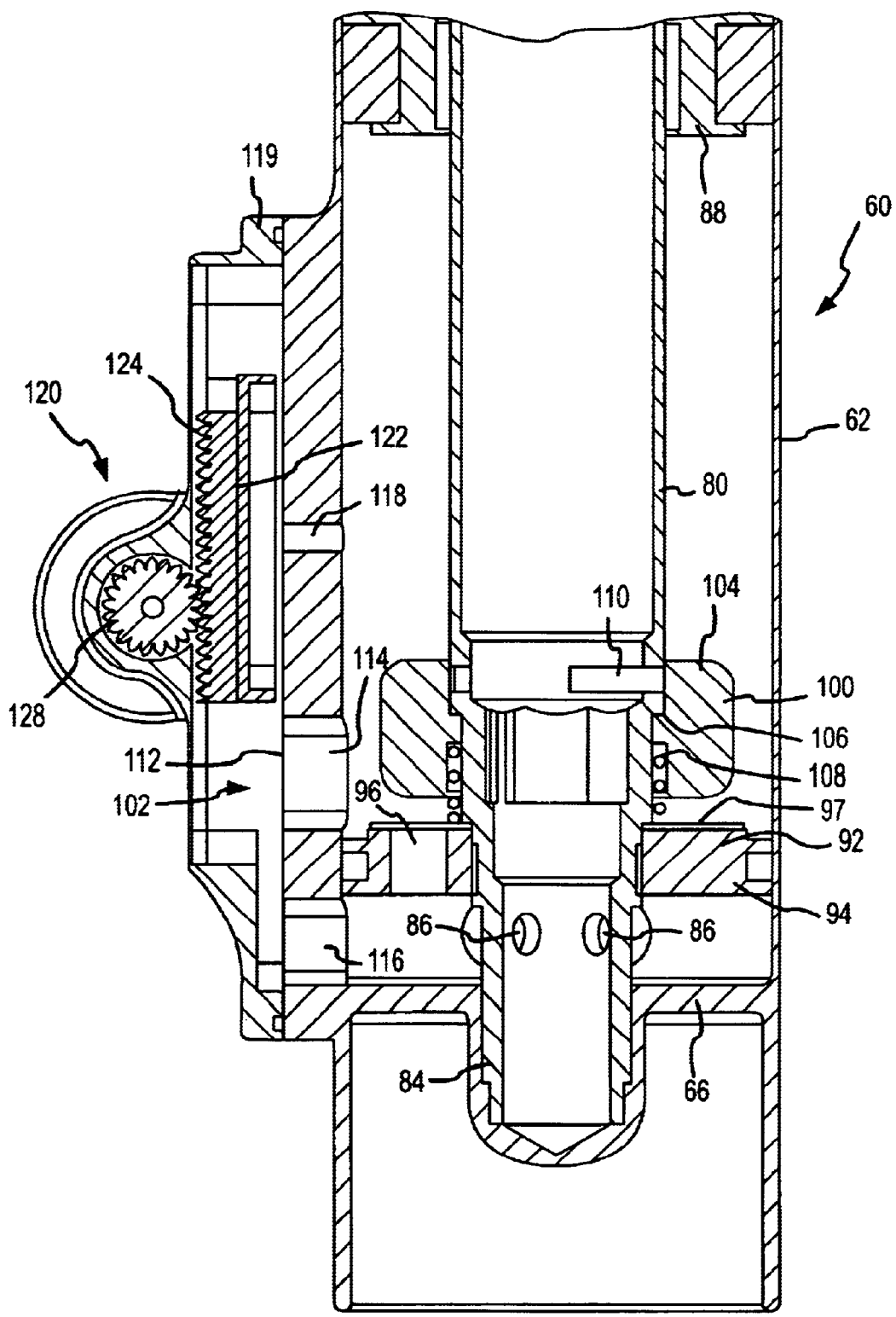
FIG. 6 is an enlarged view of a bottom end of the shock absorber of FIG. 5A.
Figure 7:
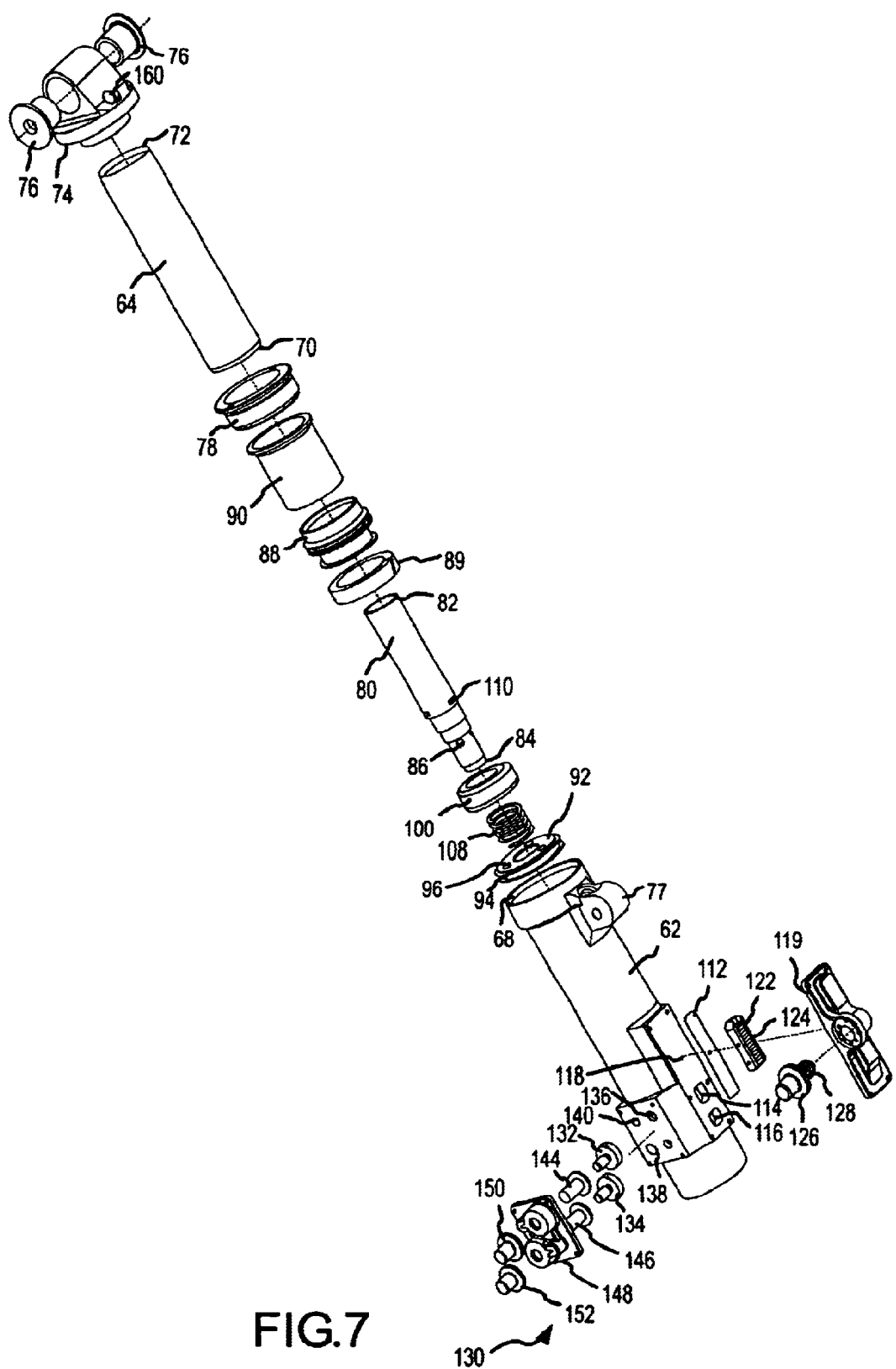
FIG. 7 is an exploded view of the shock absorber of FIG. 4.
Figure 8:
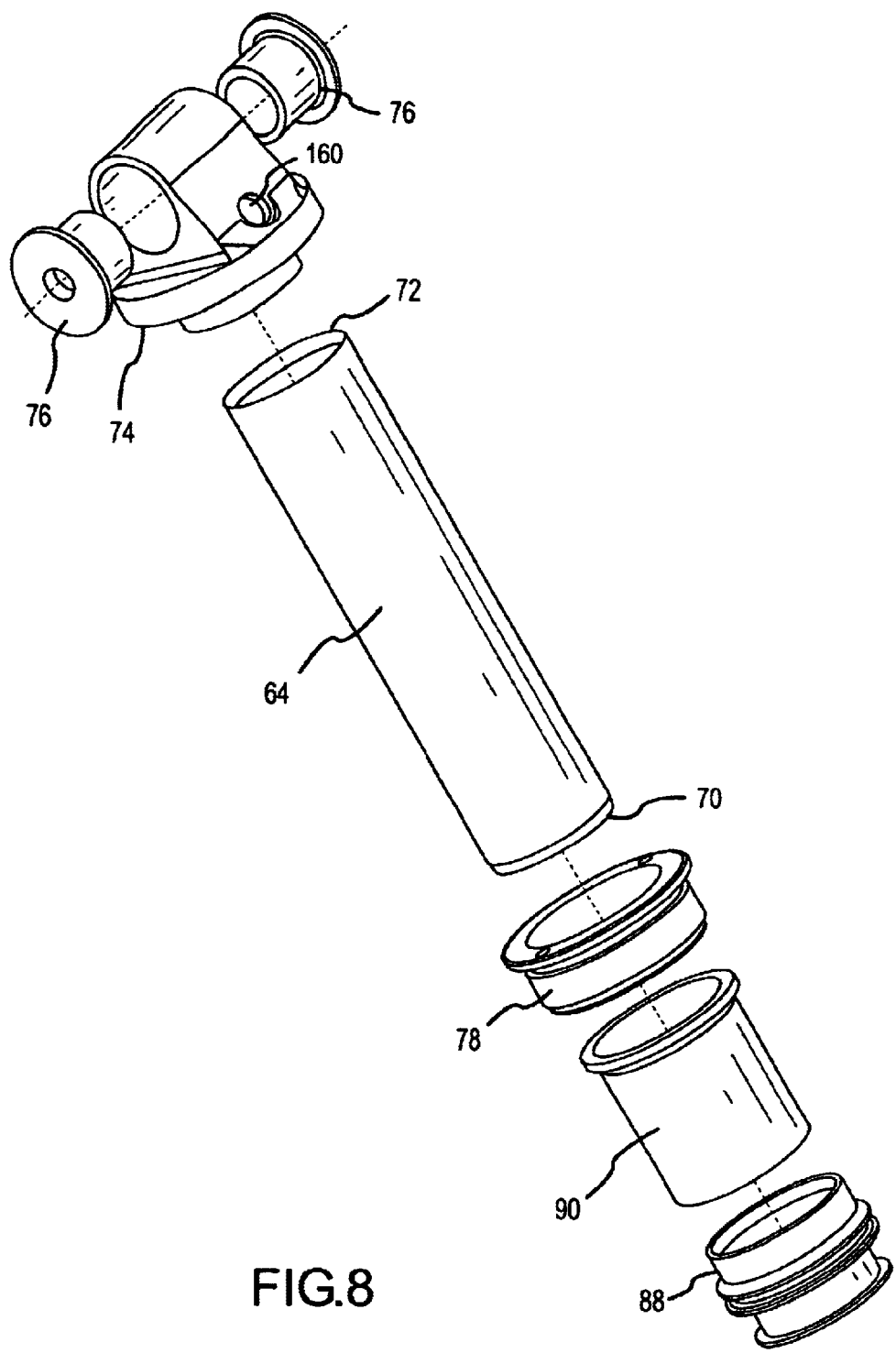
FIGS. 8–10 are more detailed views of the shock absorber of FIG. 7.
Figure 9:
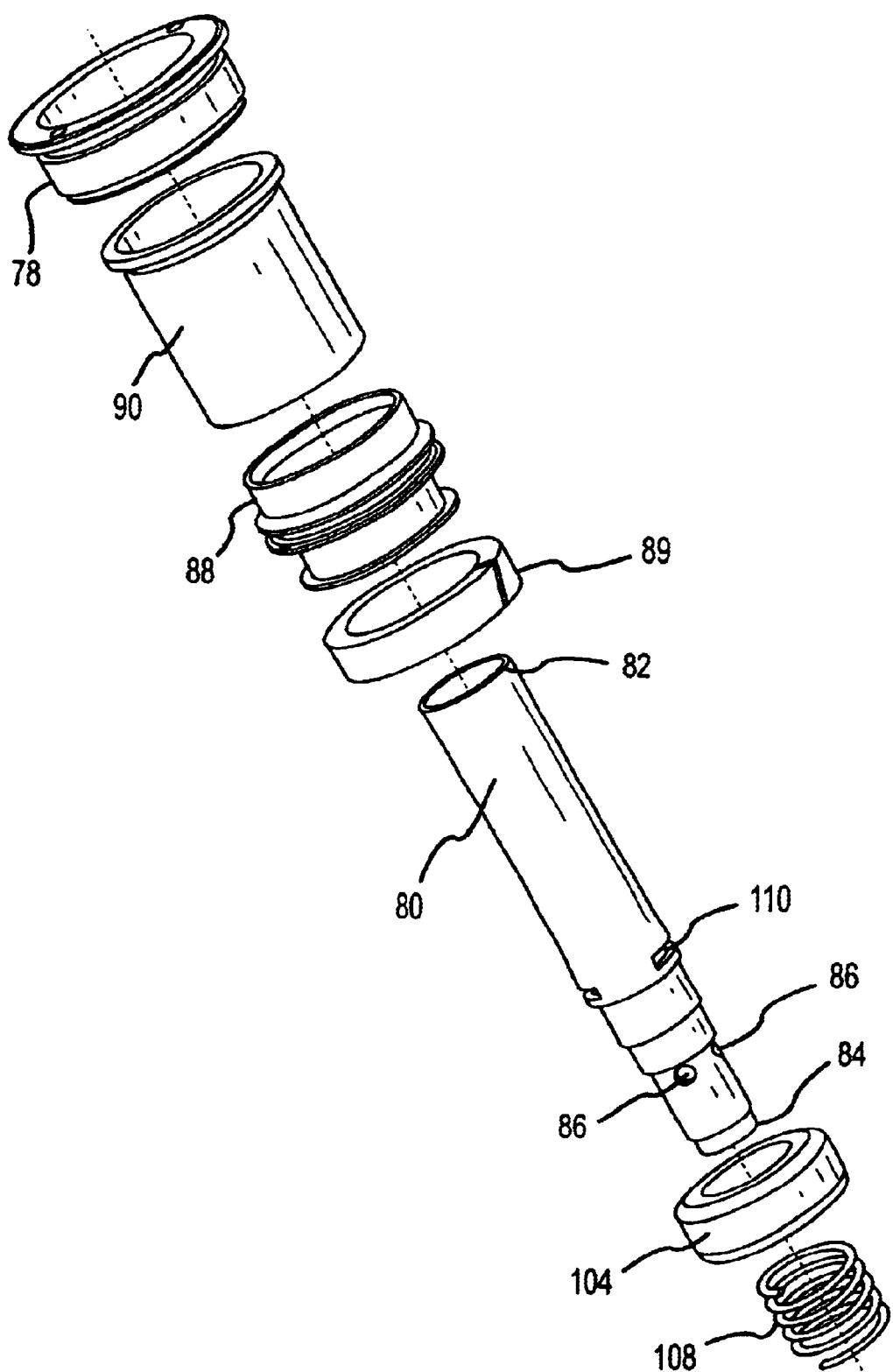
Figure 10:
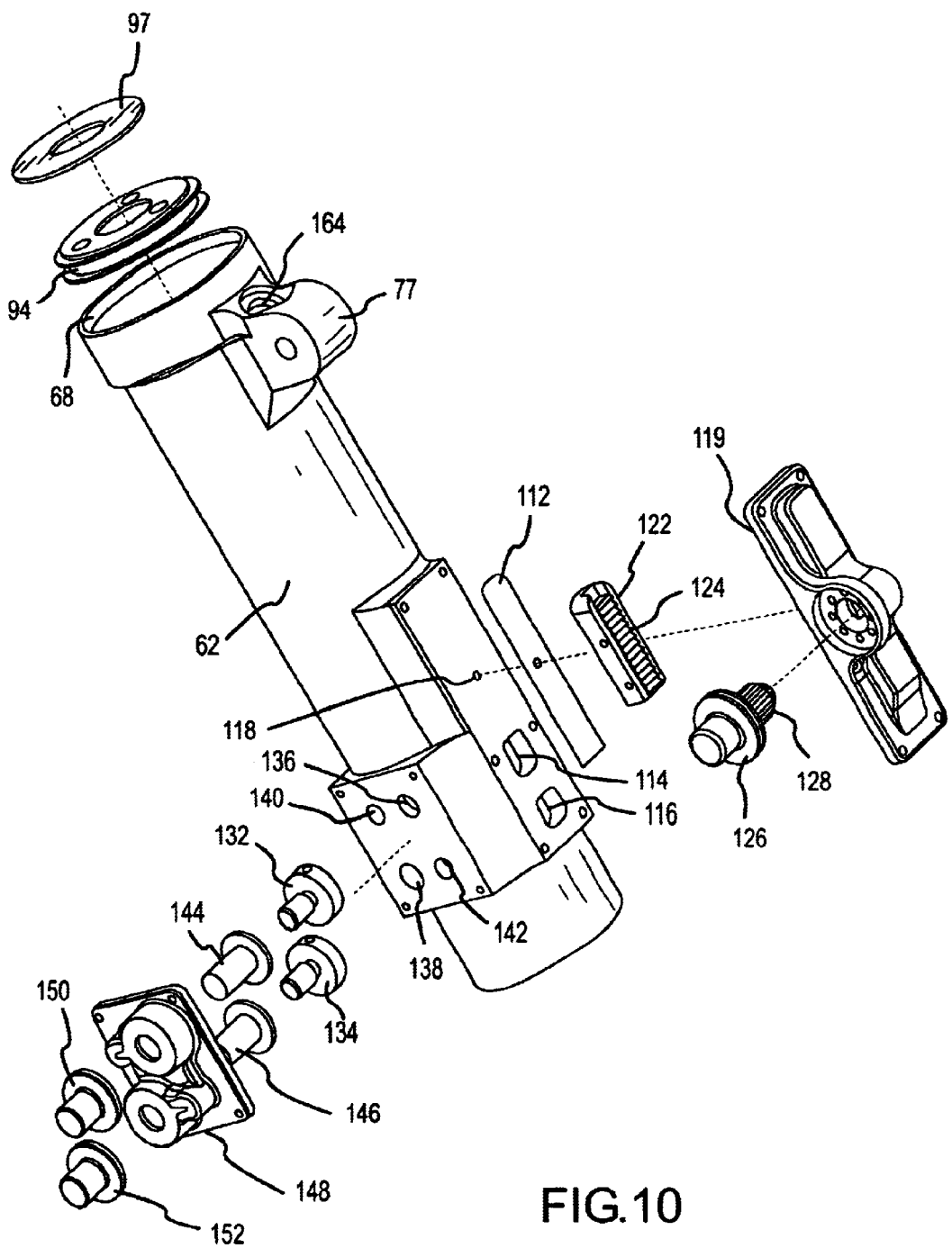

Securely fixed to damper tube 30 is a two-way regulation valve 42. Regulation valve 42 includes one or more inflow orifices 44 and one or more outflow orifices 46 that are formed in an annular member 48. Conveniently, damper tube 30 may be threaded and annular member 48 may be screwed on to damper tube 30. Further, annular member 48 is configured to provide a seal at the interface with outer tube 12 so that fluid flow will only be permitted through orifices 44 and 46. Disposed on top of annular member 48 is a biasing washer 50, and disposed on the bottom of annular member is a biasing washer 52. As shown in FIG. 3, annular member 48 includes recesses 47 to permit fluid flow around biasing washer 50 (see FIG. 2) and recesses 49 to permit fluid flow around biasing washer 52 (see FIG. 2). Due to the construction of annular member 48, fluid flow is permitted in a downward direction through inflow orifice 44 and in an upward direction through orifice 46. When fluids pass through inflow orifice 44, the amount of fluid flow through the orifice is controlled by biasing washer 52. Conversely, fluid flow through outflow orifice 46 is controlled by biasing washer 50. Accordingly, the tension on washers 50 and 52 may be varied to regulate the amount of fluid flow through the orifices. Conveniently, biasing washers 50 and 52 may be constructed of a resilient material, such as steel, plastics, composites, and the like, and will separate from annular member 48 depending on the pressure of the fluid.

In operation, outer tube 12 is filled with a damper fluid, with the damper fluid also filling damper tube 30 and extending into inner tube 14. A top portion of inner tube 14 is filled with a compressible gas. When shock absorber 10 experiences a compressive force, inner tube 14 is axially moved further within outer tube 12. In so doing, the damper fluid within outer tube 12 flows through orifice 44, with the fluid flow being regulated by biasing washer 52. The damper fluid continues its flow through orifices 36 and into damper tube 30 where the level of damper fluid within inner tube 14 rises. This in turn causes the gas within inner tube 14 to compress to damp the shock experienced by the shock absorber. Conversely, when shock absorber 10 is extended, inner tube 14 moves away from outer tube 12 to cause the damper fluid to flow out of damper tube 30, through orifices 36 and upward through orifice 46. The flow back into outer tube 12 is then controlled by the biasing force applied by biasing washer 50.

Although not shown, a floating piston may be provided within inner tube 14 to separate the gas from the damper fluid. Optionally, a biasing member, such as a spring, may be placed between end 22 and the floating piston to resist movement of the floating piston toward the closed end of the inner tube when the shock absorber is compressed. A negative biasing effect may also be produced by placing a biasing mechanism between seal head 28 and sealing piston 38. Conveniently, the biasing mechanism may comprise a pressurized gas that fills the space between outer tube 12 and inner tube 14 such that a negative biasing effect is created when shock absorber 10 is extended.

Referring now to FIGS. 4–10, another embodiment of a shock absorber 60 will be described. Shock absorber 60 comprises an outer tube 62 and an inner tube 64 that may be constructed similar to the corresponding components of shock absorber 10. As such, outer tube 62 has a closed bottom end 66 and an open top end 68. Inner tube 64 has an open end 70 and a closed end 72. Conveniently, end 72 of inner tube is closed by use of a top cap 74. Optionally, top cap 74 may include pivot axles 76 to permit shock absorber 60 to be pivotally coupled to a structural member. However, it will be appreciated that other types of connectors may be employed. Optionally, outer tube 62 may include a connector 77 to permit a structural member to be coupled to outer tube 62. However, it will be appreciated that a variety of other types of connectors may be employed, including those which are provided at other locations on outer tube 62. Coupled to top end 68 of outer tube 62 is a seal head 78 that provides a seal between outer tube 62 and inner tube 64 in a manner similar to that described in connection with shock absorber 10.

Disposed within outer tube 62 is a damper tube 80. Conveniently, damper tube 80 may be secured to bottom end 66 so as to be centrally and vertically oriented within outer tube 62 in a manner similar to that described in connection with shock absorber 10. The damper tube 80 includes an open end 82 and may optionally include a threaded end 84 to permit damper tube 80 to be screwed into bottom end 66. Damper tube 80 also includes a plurality of orifices 86 to permit fluid flow between outer tube 62 and damper tube 80 in a manner similar to that described in connection with shock absorber 10.

A sealing piston 88 is coupled to end 70 of inner tube 64 and is slideable over damper tube 80. Sealing piston 88 provides a seal between the inner wall of outer tube 62 and the outer wall of damper tube 80 to permit fluids held between outer tube 62 and damper tube 80 to be forced downward upon translation of inner tube 64 in a manner similar to that described in connection with shock absorber 10. A glide ring 89 is coupled about sealing piston 88 to facilitate translation of inner tube 64 within outer tube 62. Conveniently, a spacer 90 may be provided between sealing piston 88 and seal head 78 to create an over extension stop for shock absorber 60. Optionally, spacer 90 may also be part of the seal head or the sealing piston.

Threadedly secured to damper tube 80 is a regulation valve 92 that operates as a one-way valve. Regulation valve 92 comprises an annular member 94 having orifices 96. Annular member 94 creates a seal with outer tube 62 so that fluid flow is only permitted through orifices 96. Further, a washer 97 is positioned on top of annular member 94 to create a check valve so that fluid flow is only permitted upwardly through valve 92. Further, washer 97 may be employed to regulate the amount of fluid flow through valve 92 in a manner similar to that described in connection with shock absorber 10. Hence, when shock absorber 10 is extended, a damper fluid within damper tube 80 is permitted to flow through orifices 86 and through orifices 96 of regulation valve 92 where it enters outer tube 62. However, upon compression of shock absorber 60, fluid flow is prevented from passing through regulation valve 92.

When shock absorber 60 is compressed, the damper fluid within outer tube 62 may pass into damper tube 80 in one of two ways depending on the nature of the compressive force. For example, if the compressive force is an abrupt force an inertia valve 100 is open to permit the damping fluid to flow into damper tube 80. More slowly generated compressive forces cause the damper fluid to flow through a reed type valve 102, through orifices 86 and into damper tube 80.

Inertia valve 100 is constructed of an annular valve member 104 that is disposed about damper tube 80. Annular valve member 104 is preferably constructed of a heavy material, such as steel, brass or the like. Further, damper tube 80 includes a shoulder or stop 106 that stops upward travel of valve member 104. A spring 108 is employed to bias valve member 104 against stop 106. Damper tube 80 also includes an orifice 110 that is covered by valve member 104 when valve member 104 is biased against stop 106. This position may conveniently be defined as a closed position. When an abrupt compressive force is applied to shock absorber 60, damper tube 80 moves upward. Valve member 104 resists upward movement because of its relatively large mass, thereby causing compressing spring 108 to compress. In so doing, valve 100 placed in an open position where orifice 110 is in fluid communication with outer tube 62. In this way, the damper fluid may pass through orifice 110 and into damper tube 80.

In one specific implementation, valve member 104 may have a mass of about 53 grams, and spring may have an uncompressed length of about 10 mm. The spring rate may be about 57 grams/mm, and the spring force (pre-load) on the valve when assembled may be about 142 grams. However, it will be appreciated that the invention is not intended to be limited to these specific parameters.

Hence, by utilizing inertia valve 100, another avenue is provided to permit the damper fluid to pass into damper tube 80 when an abrupt compressive force is applied. When experiencing compressive forces that are less abrupt, the threshold biasing force applied by spring 108 is not overcome so that inertia valve 100 is not opened. However, the damper fluid may still flow into damper tube 80 through reed type valve 102.

Valve 102 is constructed of a valve shim 112 that is secured to outer tube 62 so as to be positioned over an orifice 114 in outer tube 62. Another orifice 116 is also provided in the wall of outer tube 62 and is not covered by valve shim 112. Valve shim 112 may be constructed from a resilient material, such as spring steel, plastics, composites, and the like, and serves to regulate the flow of the damper fluid through orifice 114. Valve shim 112 also serves as a check valve to prevent the flow of damper fluid back through orifice 114 during extension. Conveniently, outer tube 62 may include a hole 118 to permit shim 112 to be screwed to outer tube 62. Valve 102 further comprises a cover 119 that is secured to outer tube 62 and provides a fluid path around regulation valve 92. In this way, when shock absorber 60 is compressed, the damper fluid within outer tube 62 will flow through orifice 114, past valve shim 112, through orifice 116, and back into outer tube 62 where it will pass through orifices 86 and into damper tube 80. In this way, the damper fluid may flow into damper tube 80 through either inertia valve 100 or valve 102 depending on the type of compressive force.

Shock absorber 60 further includes an adjustment mechanism 120 to adjust the amount of tension on valve shim 112. In this way, the amount of fluid flow passing through orifice 114 may be controlled externally. Adjustment mechanism 120 comprises a rigid plate 122 having a rack gear 124. Adjustment mechanism 120 further comprises a knob 126 having a pinion gear 128. Plate 122 is disposed between cover 119 and valve shim 112 with a sufficient tolerance to permit plate 122 to be linearly translated back and forth over valve shim 112. Knob 126 is coupled to cover 119 and may be rotated to move plate 122. With such a configuration, the spring rate of valve shim 112 may be adjusted externally by simply rotating knob 126.

Shock absorber 60 may optionally include a fine-tune adjustment system 130 to fine tune the damping characteristics of shock absorber 60. Adjustment system 130 comprises a pair of adjuster plates 132 and 134 that are placed over orifices 140 and 138, respectively, in outer tube 62. Plates 132 and 134 have threaded stems 133 and 135, respectively. Outer tube 62 further includes another set of orifices 136 and 142. The spacing between adjuster plates 132 and 134 and orifices 140 and 138 may be varied to vary the amount of damper fluid that flows out of outer tube 62 through orifices 140 or 138, past adjustment plates 132 or 134, and back into outer tube 62 through orifices 136 or 142. Check valves, such as ball bearings (not shown) are positioned over orifices 136 and 142. Disposed over adjuster plates 132 and 134 are adjuster hats 144 and 146 that have threaded interiors to mate with stems 133 and 135. Hats 144 and 146 are held in place by an adjuster case 148 that is coupled to outer tube 62. Adjust knobs 150 and 152 are provided to adjust the spacing of plates 132 and 134 relative to outer tube 62 to control the amount of damper fluid passing through adjustment system 130. More specifically, when knobs 150 and 152 are rotated, hats 144 and 146 are also rotated. Case 148 prevents plates 132 and 134 from rotating while also permitting plates 132 and 134 to move toward or away from outer tube 62.

Although the fine-tune adjustment system is shown with adjuster plates, it will be appreciated that a variety of mechanisms may be employed to provide fine tune adjustment of the damping characteristics. For example, adjustment system 130 may comprise needle valves that are moved into and out of orifices formed within outer tube 62.

In use, outer tube 62 and damper tube 80 are filled with a damper fluid. The damper fluid 67 extends to a certain level within inner tube 64. The remainder of the space within inner tube 64 is filled with a compressible gas 63. Conveniently, a port 160 and an inflation valve (not shown), such as is used with conventional tires, is provided in top cap 74 to regulate the amount of pressurized gas 63 within inner tube 64. As shock absorber 60 is compressed, the fluid 67 within outer tube 62 is forced downward and will pass through inertia valve 100 and/or valve 102, depending on the type of compressive force. This in turn will cause the fluid 67 level within inner tube 64 to rise to compress the gas 63 and bias the system. When shock absorber 60 is forced to extend from the pressure exerted by the pressurized gas 63 (and/or a spring force as described below), the damper fluid 67 will be forced to flow out-of damper tube 80, through orifices 86 and upward through regulation valve 92. Hence, the gas pressure may only extend the shock absorber 60 at a rate allowed by regulation valve 92.

As with shock absorber 10, shock absorber 60 may include a floating piston 162 (see FIG. 5A) that is positioned between the damper fluid 67 and the gas 63, and a spring 65 to provide a positive biasing effect for the shock absorber. As another option, the space between seal head 78 and sealing piston 88 may be filled with a gas 63 to provide a negative biasing effect. Conveniently, a port 164 may be provided to adjust the amount of gas 69 between seal head 78 and sealing piston 88.

The invention has now been described in detail for purposes of clarity of understanding. However, it will be appreciated that certain changes and modifications may be practiced within the scope of the appended claims. For example, it will be appreciated that the various components of the different shock absorbers described herein may be interchanged with each other. For instance, shock absorber 10 may be provided with an inertia valve.

What is claimed is:

1. A fluid damped shock absorber, comprising:
   an outer tube having a closed end and an open end, wherein the outer tube is generally straight from the open end to the closed end;
   a damper tube disposed within the outer tube;
   an inner tube axially slidable within the outer tube, the inner tube having a closed end and an open end;
   a sealing piston attached to the inner tube to provide a seal between the inside of the outer tube and the outside of the damper tube;
   a sealing device attached near the open end of the outer tube to provide a seal between the outside of the inner tube and the inside of the outer tube;
   a regulation valve fixed to the damper tube in a sealed arrangement with the outer tube, wherein the regulation valve is located between the closed end of the outer tube and the sealing piston, the regulation valve being configured to regulate fluid flow of a damping fluid between the outer tube and the damper tube in both directions upon axial movement of the inner tube within the outer tube;
   wherein the outer tube and the damper tube are configured to hold the damper fluid, and wherein the inner tube is configured to hold a gas, with the pressure of the gas within the inner tube providing a biasing force to resist translation of the inner tube into the outer tube; and
   further comprising a floating piston disposed within the inner tube, the floating piston separating the gas from the damper fluid, and a biasing member disposed within the inner tube to resist movement of the floating piston toward the closed end of the inner tube;
   wherein the damper tube extends between the regulation valve and the closed end of the outer tube and includes an orifice extending through a wall of the damper tube at a location between the regulation valve and the closed end of the outer tube.

2. The shock absorber as in claim 1, wherein the damper tube includes a stop and an orifice extending through a wall of the damper tube, and further comprising an inertia valve slidably mounted about the damper tube so as to be moveable between a closed position where the inertia valve covers the orifice and an open position where the orifice is uncovered, and a biasing mechanism to bias the inertia valve against the stop to hold the inertia valve in the closed position.

3. The shock absorber as in claim 1, wherein the regulation valve comprises an annular member having a top side, a bottom side, and at least two through holes, and a washer coupled to the top side and the bottom side such that the damper fluid may pass through one of the through holes in one direction and through the other through hole in the other direction, with the washer regulating the amount of fluid flow through the through holes.

4. The shock absorber as in claim 1, further comprising a biasing system positioned between the sealing piston and the sealing device to bias the sealing piston away from the sealing device and create a negative biasing effect.

5. The shock absorber as in claim 4, wherein the biasing system comprises a gas.

6. A fluid damped shock absorber, comprising:
   an outer tube having a closed end and an open end;
   a damper tube disposed within the outer tube;
   an inner tube axially slidable within the outer tube, the inner tube having a closed end and an open end;
   a sealing piston attached to the inner tube to provide a seal between the inside of the outer tube and the outside of the damper tube;
   a sealing device attached near the open end of the outer tube to provide a seal between the outside of the inner tube and the outer tube;
   a regulation valve fixed to the damper tube in a sealed arrangement with the outer tube, wherein the regulation valve is located between the closed end of the outer tube and the sealing piston, the regulation valve being configured to regulate fluid flow of a damping fluid from the damper tube and into the outer tube upon axial movement of the inner tube away from the outer tube;
   wherein the outer tube includes a first orifice that is located between the regulation valve and the sealing piston and a second orifice that is located between the regulation valve and the closed end of the outer tube;
   a cover disposed over the first and second orifices, the cover being configured to permit the flow of the damping fluid between the first and second orifices; and
   a valve shim disposed over the first orifice, wherein the valve shim is configured to regulate the flow of the damping fluid around the regulation valve and into the damper tube upon axial movement of the inner tube into the outer tube.

7. The shock absorber as in claims 6, further comprising an adjustment mechanism to adjust the spring rate of the valve shim.

8. The shock absorber as in claim 7, further comprising a rigid plate that is slidable over the valve shim to adjust the spring rate of the valve shim.

9. The shock absorber as in claim 8, wherein the plate includes a rack gear, and further comprising a pinion gear to move the plate and thereby adjust the spring rate of the valve shim.

10. The shock absorber as in claim 6, wherein the damper tube includes a stop and an orifice extending through a wall of the damper tube, and further comprising an inertia valve slidably mounted about the damper tube so as to be movable between a closed position where the inertia valve covers the orifice and an open position where the orifice is uncovered, and a biasing mechanism to bias the inertia valve against the stop to hold the inertia valve in the closed position.

11. The shock absorber as in claim 6, further comprising a biasing system positioned between the sealing piston and the sealing device to bias the sealing piston away from the sealing device and create a negative biasing effect.

12. The shock absorber as in claim 11, wherein the biasing system comprises a gas.

13. A method for absorbing a shock, the method comprising:
    providing a fluid damped shock absorber comprising an outer tube having a closed end and an open end, a damper tube disposed within the outer tube, an inner tube axially slidable within the outer tube, the inner tube having a closed end and an open end, a sealing piston attached to the inner tube to provide a seal between the inside of the outer tube and the outside of the damper tube, a sealing device attached near the open end of the outer tube to provide a seal between the outside of the inner tube and the outer tube, a regulation valve fixed to the damper tube in a sealed arrangement with the outer tube, wherein the regulation valve is located between the closed end of the outer tube and the sealing piston, wherein the outer tube includes a first orifice that is located between the regulation valve and the sealing piston and a second orifice that is located between the regulation valve and the closed end of the outer tube, a cover disposed over the first and second orifices, the cover being configured to permit fluid flow between the first and second orifices, and a valve shim disposed over the first orifice; and applying a compressive force to the shock absorber to cause a damper fluid in the outer tube to pass through the first orifice, past the valve shim, through the second orifice and into the damper tube.

14. The method as in claim 13, further comprising extending the shock absorber to cause the damper fluid to pass from the damper tube, through the regulation valve, and into the outer tube.

15. The method as in claim 13, wherein the damper tube includes a stop and an orifice extending through a wall of the damper tube, and wherein the shock absorber further comprises an inertia valve slidably mounted about the damper tube so as to be movable between a closed position where the inertia valve covers the orifice and an open position where the orifice is uncovered, and a biasing mechanism to bias the inertia valve against the stop to hold the inertia valve in the closed position, and further comprising applying an abrupt compressive force to the shock absorber to cause the inertia valve to be placed in the open position and to permit the damper fluid to flow through the orifice and into the damper tube.

16. A fluid damped shock absorber, comprising:
a shock absorber housing that is adapted to hold a fluid, wherein the housing includes a first orifice and a second orifice that extend through the housing;
a cover disposed over the first and second orifices to permit the flow of the fluid between the first and the second orifices;
a valve system to regulate the flow of the fluid through the orifices, the valve system comprising a flexible valve member that is disposed over and completely covers the first orifice and a rigid member that is slidable over the valve member to adjust the spring rate of the valve member, wherein the flexible valve member is configured to flex away from the first orifice to regulate the flow of fluid through the first orifice;
wherein the rigid member includes a rack gear, and further comprising a pinion gear to move the rigid member and thereby adjust the spring rate of the valve member.

17. A fluid damped shock absorber, comprising:
an outer tube having a closed end and an open end;
a damper tube disposed within the outer tube, wherein the outer tube and the damper tube are configured to hold a damping fluid;
an inner tube axially slidable within the outer tube, the inner tube having a closed end and an open end, wherein the inner tube is configured to hold a gas, with the pressure of the gas within the inner tube providing a biasing force to resist translation of the inner tube into the outer tube;
a floating piston disposed within the inner tube, the floating piston separating the gas from the damping fluid;
a biasing member disposed within the inner tube to resist movement of the floating piston toward the closed end of the inner tube;
a sealing piston attached to the inner tube to provide a seal between the inside of the outer tube and the outside of the damper tube;
a sealing device attached near the open end of the outer tube to provide a seal between the outside of the inner tube and the inside of the outer tube;
a regulation valve fixed to the damper tube in a sealed arrangement with the outer tube, wherein the regulation valve is located between the closed end of the outer tube and the sealing piston, the regulation valve being configured to regulate fluid flow of the damping fluid between the outer tube and the damper tube upon axial movement of the inner tube within the outer tube;
wherein the damper tube extends between the regulation valve and the closed end of the outer tube and includes an orifice extending through a wall of the damper tube at a location between the regulation valve and the closed end of the outer tube.

18. The shock absorber as in claim 17, wherein the damper tube includes a stop and an orifice extending through a wall of the damper tube, and further comprising an inertia valve slidably mounted about the damper tube so as to be movable between a closed position where the inertia valve covers the orifice and an open position where the orifice is uncovered, and a biasing mechanism to bias the inertia valve against the stop to hold the inertia valve in the closed position.

19. The shock absorber as in claim 17, wherein the regulation valve comprises an annular member having a top side, a bottom side, and at least two through holes, and a washer coupled to the top side and the bottom side such that the damper fluid may pass through one of the through holes in one direction and through the other through hole in the other direction, with the washer regulating the amount of fluid flow through the through holes.

20. The shock absorber as in claim 17, further comprising a biasing system positioned between the sealing piston and the sealing device to bias the sealing piston away from the sealing device and create a negative biasing effect.

21. The shock absorber as in claim 20, wherein the biasing system comprises the gas.

22. A fluid damped shock absorber, comprising:
an outer tube having a closed end and an open end;
a damper tube disposed within the outer tube, wherein the damper tube includes a stop and an orifice extending through a wall of the damper tube, and further comprising an inertia valve slidably mounted about the damper tube so as to be movable between a closed position where the inertia valve covers the orifice and an open position where the orifice is uncovered, and a biasing mechanism to bias the inertia valve against the stop to hold the inertia valve in the closed position;
an inner tube axially slidable within the outer tube, the inner tube having a closed end and an open end;
a sealing piston attached to the inner tube to provide a seal between the inside of the outer tube and the outside of the damper tube;

a sealing device attached near the open end of the outer tube to provide a seal between the outside of the inner tube and the outer tube;

a regulation valve fixed to the damper tube in a sealed arrangement with the outer tube, wherein the regulation valve is located between the closed end of the outer tube and the sealing piston, the regulation valve being configured to regulate fluid flow of a damping fluid between the outer tube and the damper tube upon axial movement of the inner tube within the inside of the outer tube;

wherein when the shock absorber is abruptly compressed, the inertia valve moves to the open position.

23. The shock absorber as in claim 22, wherein the outer tube and the damper tube are configured to hold the damper fluid, and wherein the inner tube is configured to hold a gas, with the pressure of the gas within the inner tube providing a biasing force to resist translation of the inner tube into the outer tube.

24. The shock absorber as in claim 23, further comprising a floating piston disposed within the inner tube, the floating piston separating the gas from the damper fluid, and a biasing member disposed within the inner tube to resist movement of the floating piston toward the closed end of the inner tube.

25. The shock absorber as in claim 22, wherein the damper tube extends between the regulation valve and the closed end of the outer tube, and includes an orifice extending through a wall of the damper tube at a location between the regulation valve and the closed end of the outer tube.

26. The shock absorber as in claim 22, wherein the regulation valve comprises an annular member having a top side, a bottom side, and at least two through holes, and a washer coupled to the top side and the bottom side such that the damper fluid may pass through one of the through holes in one direction and through the other through hole in the other direction, with the washer regulating the amount of fluid flow through the through holes.

27. The shock absorber as in claim 22, further comprising a biasing system positioned between the sealing piston and the sealing device to bias the sealing piston away from the sealing device and create a negative biasing effect.

28. The shock absorber as in claim 27, wherein the biasing system comprises a gas.

29. A fluid damped shock absorber, comprising:

an outer tube having a closed end and an open end, wherein the outer tube is generally straight from the open end to the closed end;

a damper tube disposed within the outer tube;

an inner tube axially slidable within the outer tube, the inner tube having a closed end and an open end;

a sealing piston attached to the inner tube to provide a seal between the inside of the outer tube and the outside of the damper tube;

a sealing device attached near the open end of the outer tube to provide a seal between the outside of the inner tube and the inside of the outer tube;

a regulation valve fixed to the damper tube in a sealed arrangement with the outer tube, wherein the regulation valve is located between the closed end of the outer tube and the sealing piston, the regulation valve being configured to regulate fluid flow of a damping fluid between the outer tube and the damper tube in both directions upon axial movement of the inner tube within the outer tube;

wherein the damper tube extends between the regulation valve and the closed end of the outer tube, and includes an orifice extending through a wall of the damper tube at a location between the regulation valve and the closed end of the outer tube.

30. A fluid damped shock absorber, comprising:

an outer tube having a closed end and an open end, wherein the outer tube is generally straight from the open end to the closed end;

a damper tube disposed within the outer tube;

an inner tube axially slidable within the outer tube, the inner tube having a closed end and an open end;

a sealing piston attached to the inner tube to provide a seal between the inside of the outer tube and the outside of the damper tube;

a sealing device attached near the open end of the outer tube to provide a seal between the outside of the inner tube and the inside of the outer tube;

a regulation valve fixed to the damper tube in a sealed arrangement with the outer tube, wherein the regulation valve is located between the closed end of the outer tube and the sealing piston, the regulation valve being configured to regulate fluid flow of a damping fluid between the outer tube and the damper tube in both directions upon axial movement of the inner tube within the outer tube;

wherein the damper tube includes a stop and an orifice extending through a wall of the damper tube, and further comprising an inertia valve slidably mounted about the damper tube so as to be moveable between a closed position where the inertia valve covers the orifice and an open position where the orifice is uncovered, and a biasing mechanism to bias the inertia valve against the stop to hold the inertia valve in the closed position.

31. A fluid damped shock absorber, comprising:

an outer tube having a closed end and an open end, wherein the outer tube is generally straight from the open end to the closed end;

a damper tube disposed within the outer tube;

an inner tube axially slidable within the outer tube, the inner tube having a closed end and an open end;

a sealing piston attached to the inner tube to provide a seal between the inside of the outer tube and the outside of the damper tube;

a sealing device attached near the open end of the outer tube to provide a seal between the outside of the inner tube and the inside of the outer tube;

a regulation valve fixed to the damper tube in a sealed arrangement with the outer tube, wherein the regulation valve is located between the closed end of the outer tube and the sealing piston, the regulation valve being configured to regulate fluid flow of a damping fluid between the outer tube and the damper tube in both directions upon axial movement of the inner tube within the outer tube;

wherein the outer tube and the damper tube are configured to hold the damper fluid, and wherein the inner tube is configured to hold a gas, with the pressure of the gas within the inner tube providing a biasing force to resist translation of the inner tube into the outer tube; and further comprising a floating piston disposed within the inner tube, the floating piston separating the gas from the damper fluid, and a biasing member disposed within the inner tube to resist movement of the floating piston toward the closed end of the inner tube;

wherein the damper tube includes a stop and an orifice extending through a wall of the damper tube, and further comprising an inertia valve slidably mounted about the damper tube so as to be moveable between a closed position where the inertial valve covers the orifice and an open position where the orifice is uncovered, and a biasing mechanism to bias the inertia valve against the stop to hold the inertia valve in the closed position.

32. A fluid damped shock absorber, comprising:

an outer tube having a closed end and an open end;

a damper tube disposed within the outer tube, wherein the outer tube and the damper tube are configured to hold a damping fluid;

an inner tube axially slidable within the outer tube, the inner tube having a closed end and an open end, wherein the inner tube is configured to hold a gas, with the pressure of the gas within the inner tube providing a biasing force to resist translation of the inner tube into the outer tube;

a floating piston disposed within the inner tube, the floating piston separating the gas from the damping fluid;

a biasing member disposed within the inner tube to resist movement of the floating piston toward the closed end of the inner tube;

a sealing piston attached to the inner tube to provide a seal between the inside of the outer tube and the outside of the damper tube;

a sealing device attached near the open end of the outer tube to provide a seal between the outside of the inner tube and the inside of the outer tube;

a regulation valve fixed to the damper tube in a sealed arrangement with the outer tube, wherein the regulation valve is located between the closed end of the outer tube and the sealing piston, the regulation valve being configured to regulate fluid flow of the damping fluid between the outer tube and the damper tube upon axial movement of the inner tube within the outer tube;

wherein the damper tube includes a stop and an orifice extending through a wall of the damper tube, and further comprising an inertia valve slidably mounted about the damper tube so as to be movable between a closed position where the inertia valve covers the orifice and an open position where the orifice is uncovered, and a biasing mechanism to bias the inertia valve against the stop to hold the inertia valve in the closed position.

* * * * *